US012454443B2

(12) United States Patent
Zimmerman

(10) Patent No.: US 12,454,443 B2
(45) Date of Patent: Oct. 28, 2025

(54) CONTINUOUS CONTAINER CRANE DEVICE

(71) Applicant: Ronald C. Zimmerman, Marvin, NC (US)

(72) Inventor: Ronald C. Zimmerman, Marvin, NC (US)

( * ) Notice: Subject to any disclaimer, the term of this patent is extended or adjusted under 35 U.S.C. 154(b) by 829 days.

(21) Appl. No.: 17/734,016

(22) Filed: Apr. 30, 2022

(65) Prior Publication Data

US 2023/0348236 A1 Nov. 2, 2023

(51) Int. Cl.

*B66C 7/08* (2006.01)
*B66C 9/04* (2006.01)
*B66C 17/20* (2006.01)
*B66C 9/14* (2006.01)

(52) U.S. Cl.

CPC .................. *B66C 7/08* (2013.01); *B66C 9/04* (2013.01); *B66C 17/20* (2013.01); *B66C 9/14* (2013.01); *B66C 2700/018* (2013.01)

(58) Field of Classification Search

CPC .... B66C 7/08; B66C 9/04; B66C 9/14; B66C 17/20; B66C 2700/018
See application file for complete search history.

(56) References Cited

U.S. PATENT DOCUMENTS 4,946,328 A 8/1990 Barry
2013/0213755 A1* 8/2013 Shibata ...................... B61J 1/06 191/22 R

* cited by examiner

*Primary Examiner* — Robert J McCarry, Jr.
(74) *Attorney, Agent, or Firm* — PATENTFILE, LLC; Bradley C. Fach; Steven R. Kick

(57) ABSTRACT

A continuous container crane device may include a first track having a continuous shape and a second track having a continuous shape. Preferably, the first track may be substantially parallel to the second track. One or more trolleys may be movably coupled to the first track and to the second track so that the trolleys are configured to move in a continuous movement path (starts and finishes at the same place) defined by the first and second track. Each trolley may include a lifting mechanism that may be coupled to a container spreader which may be removably coupled to shipping containers for the transport of shipping containers to and from trucks with a chassis trailer, all types of intermodal railroad flat cars, ships and other water traveling vessels, container storage lots, etc.

14 Claims, 9 Drawing Sheets

CONTINUOUS CONTAINER CRANE DEVICE

FIELD OF THE INVENTION

This patent specification relates to the field of devices for moving and positioning shipping containers and other bulk cargo containers. More specifically, this patent specification relates to a lifting device configured to be capable of simultaneously transporting two or more shipping containers in a plurality of positions, such as for the purpose of repositioning containers from a docked and loaded vessel or conversely reposition containers with the purpose of loading containers onto a docked vessel.

BACKGROUND

When bringing a vessel dockside for the purpose of unloading shipping containers, the prime objective is to safety, and quickly unload the ship as fast as possible so that the ship can reload containers and proceed to transit other containers to other port destinations.

Container loading and unloading commonly is accomplished with the use of a container crane having a trolley, which rides on gantry rails. On the underside of the trolley are cables and lift mechanisms for raising and lowering the container. A device, known as a spreader is used to actually attach to a designated container. Only one lifting trolley is traditionally operated on any single crane structure regardless if unloading or loading, as the crane structure generally only allows for one trolley lifting device, so that only one container can be processed or moved at any given time. Multiple trolleys being excluded, as they get into each other's way. A few lifting trolleys have double spreaders which can lift two containers at a time, but they only marginally improve efficiency and create unloading awkwardness.

Therefore, there is a need for novel lifting devices which are able to provide increased speed and efficiency of loading and unloading shipping containers and other bulk cargo containers as compared to existing container crane devices.

BRIEF SUMMARY OF THE INVENTION

A continuous container crane device is provided which may include one or more, such as a plurality of lifting trolleys when performing unloading or loading functions which can be accomplished without having one or more trolleys obstructing the movement of other trolleys, regardless of the number of trolleys supported by the device. By being able to utilize two or more trolleys at one time on a single lift structure, unloading and the reverse load times of any given lot, vehicle, or vessel will be substantially reduced. Vessels continue to get larger, and some now have the capacity to position containers twenty-four units wide.

In some embodiments, the device may include a first track having a continuous shape, and a second track having a continuous shape in which the shapes of the first and second tracks may be complementary or substantially the same size and shape. Preferably, the first track may be substantially parallel to the second track. A first trolley may be movably coupled to the first track and to the second track so that the first trolley is configured to move in a continuous movement path defined by the first and second tracks. The first trolley may include or be configured to be coupled to a first lifting mechanism and/or a first container spreader.

In further embodiments, the device may include a first track having a discorectangular shape, in which the first track includes a first lower length, a first upper length, a first connector length, and a second connector length. The first upper length may be positioned above the first lower length, and the first connector length and second connector length may each be coupled to opposing ends of the first lower length and the first upper length. The device may further include a second track having a discorectangular shape, in which the first track is substantially parallel to the second track. A first trolley may be movably coupled to the first track and to the second track so that the first trolley is configured to move in a vertical stadium shaped movement path defined by the first and second tracks. The first trolley may include or be configured to be coupled to a first lifting mechanism and/or a first container spreader. The device may further include a second trolley that is movably coupled to the first track and to the second track so that the second trolley may be configured to move in the vertical stadium shaped movement path defined by the first and second track. The second trolley may include or be configured to be coupled to a second lifting mechanism and/or a second container spreader.

BRIEF DESCRIPTION OF THE DRAWINGS

Some embodiments of the present invention are illustrated as an example and are not limited by the figures of the accompanying drawings, in which like references may indicate similar elements and in which.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1A:
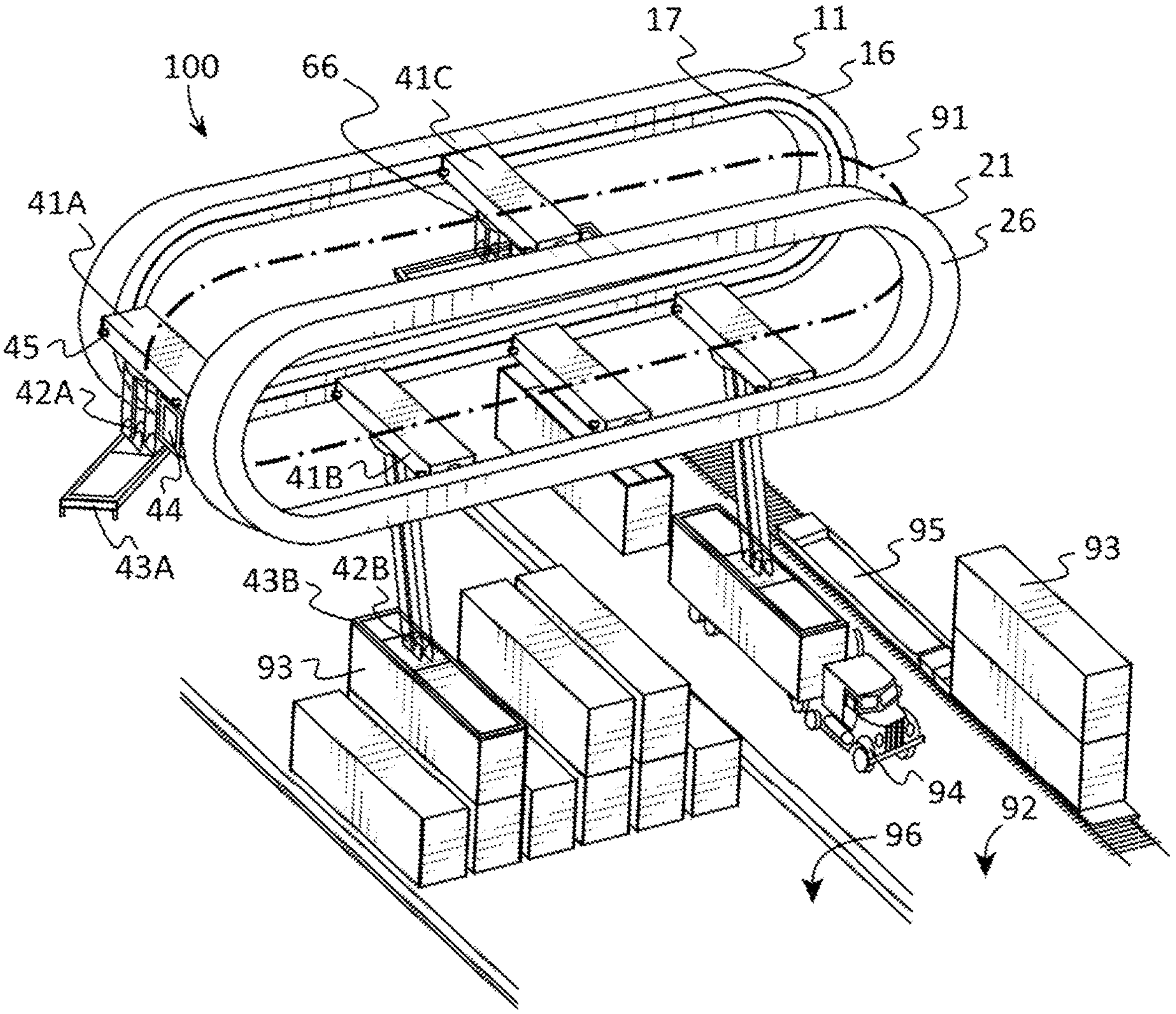
FIG. 1A-FIG. 1A depicts a perspective view of an example of a continuous container crane device according to various embodiments described herein.
Figure 1B:
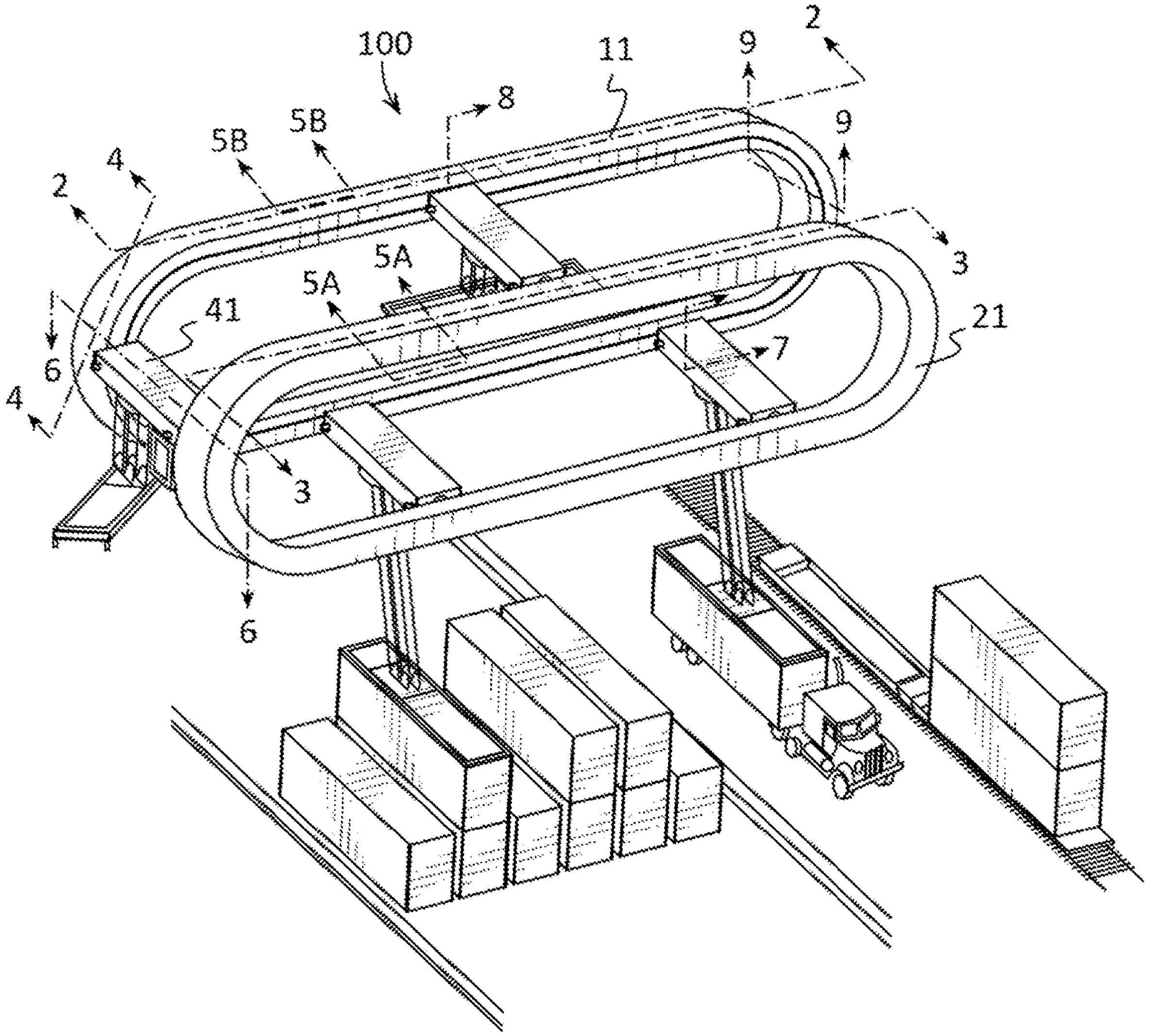
FIG. 1B-FIG. 1B shows the example continuous container crane device of FIG. 1A with sectional lines corresponding to FIGS. 2-9 according to various embodiments described herein.

For purposes of description herein, the terms "upper," "lower," "left," "right," "rear," "front," "side," "vertical," "horizontal," and derivatives thereof shall relate to the invention as oriented in FIGS. 1A and 1B. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Although the terms "first," "second," etc. are used herein to describe various elements, these elements should not be limited by these terms. These terms are only used to distinguish one element from another element. For example, the first element may be designated as the second element, and the second element may be likewise designated as the first element without departing from the scope of the invention. It should be understood that the suffixes of "A", "B", "C", etc., designate different embodiments of an element, such as to distinguish a first element from a second element in description of the invention and in the figures. For example, the teachings of a first rail 31A read on the teachings of a second rail 31B, third rail 31C, fourth rail 31D, etc., and vice versa.

As used in this application, the term "about" or "approximately" refers to a range of values within plus or minus 10% of the specified number. Additionally, as used in this application, the term "substantially" means that the actual value is within about 10% of the actual desired value, particularly within about 5% of the actual desired value and especially within about 1% of the actual desired value of any variable, element or limit set forth herein.

A new continuous container crane device is discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by example and through referencing the appended figures representing preferred and alternative embodiments. FIGS. 1A and 1B illustrate an example of a continuous container crane device ("the device") 100 according to various embodiments. In some embodiments, the device 100 may comprise a first track 11 having a continuous shape and a second track 21 having a continuous shape in which the shapes of the first 11 and second 21 tracks may be complementary or substantially the same size and shape. Preferably, the first track 11 may be substantially parallel to the second track 21 as perhaps best shown in FIGS. 1A and 1B. One or more trolleys 41, 41A, 41B, 41C, may be movably coupled to the first track 11 and to the second track 21 so that the trolleys 41, 41A, 41B, 41C, are configured to move in a continuous movement path 91 (starts and finishes at the same place) defined by the first 11 and second track 21. Each trolley 41, 41A, 41B, 41C, may comprise a lifting mechanism 42A, 42B, that may be coupled to a container spreader 43A, 43B, which may be removably coupled to shipping containers 93 for the transport of shipping containers 93 to and from trucks with a chassis trailer 94, all types of intermodal railroad flat cars 95, ships 96 and other water traveling vessels, container storage lots, etc.

The device 100 may comprise or may be coupled to a supporting structure which may be used to support the tracks 11, 21, trolleys 41, 41A, 41B, 41C, and any shipping containers 93 coupled to the trolleys 41, 41A, 41B, 41C, above a ground surface 92. A supporting structure is not shown in FIGS. 1A and 1B as these are well known in the art and any suitable supporting structure may be used to support the tracks 11, 21, trolleys 41, 41A, 41B, 41C, and any shipping containers 93 coupled to the trolleys 41, 41A, 41B, 41C, above a ground surface 92. As an example, the tracks 11, 21, may be encased, for support, in a cantilever bridge style truss structure. To allow for ship/vessel 96 clearance, the forward structure could be raised by a method similar to raising of a bascule bridge, or by using a fulcrum point offsetting weight equally. The weight balance of the structure would eliminate the need to part the over the vessel section from the dockside sections. The current cable lift method would be eliminated. The truss support structure, in its entirety, may be so balanced as to equalize the weight distribution at a designated point similar to a truss bascule bridge. To move the device 100 a minimal amount of effort will be required when activating a geared motor, attached to the truss structure, and moved by a rack, mounted on the overall dockside support structure, which is necessitated by the need to achieve adequate dockside clearance as a ship/vessel 96 docks. An alternate example method of moving the tracks 11, 21, and support structure may comprise utilizing the contemporary method of using overhead cables, but this method would require the tracks 11, 21, to be separated at the balance point. Another example would be hydraulic lifts mounted on a dockside support structure, and mounted at the balance point to raise the entire structure upward. The tracks 11, 21, may be configured wide, narrow and possibly at any width in between. In a wide configuration, the tracks 11, 21, may be positioned with a wide separation which would allow a spreader 43A, 43B, to pass between the tracks 11, 21, and remain in the same orientation as the containers 93 on the ground 92, trucks with a chassis trailer 94, railroad flat cars 95, ship/vessel 96, etc. In a narrow configuration in which the tracks 11, 21, are separated by a distance that is less than the widest dimension of a spreader 43A, 43B, the passing of a spreader 43A, 43B, must be rotated approximately 90 degrees through use of a trolley 41, 41A, 41B, 41C, lift rotation mechanism 66 located under the trolley 41, 41A, 41B, 41C. At the beginning point of the trolley 41, 41A, 41B, 41C, moving to the curved connector lengths 14, 15, 24, 25, up or down, in the narrow configuration, the lift rotation mechanism 66 mechanism will automatically rotate preferably through use of a computer-generated command instruction.

The device 100 may comprise one or more tracks, such as a first track 11 and a second track 21, to which one or more trolleys 41, 41A, 41B, 41C, may be movably coupled so that the tracks 11, 21, may define the continuous movement path 91 or circuit that the one or more trolleys 41, 41A, 41B, 41C, are allowed to move in. A continuous movement path 91 may comprise a circuit so that a trolley 41, 41A, 41B, 41C, making one complete movement through the continuous movement path 91, may start and stop in the same place. Tracks 11, 21, may be configured in any size and shape in order to define a movement path 91 of any shape and size for the one or more trolleys 41, 41A, 41B, 41C, that are movably coupled to the tracks 11, 21. In preferred embodiments, the device 100 may comprise a first track 11 and a second track 21 which may be configured to define a movement path 91 that may comprise a vertical discorectangular shape. A discorectangular shape is a two-dimensional geometric shape constructed of a rectangle with semicircles at a pair of opposite sides. The same shape is known also as a stadium shape, obround, or sausage body. A vertical discorectangular shape generally comprises a discorectangular shape generally oriented in a plane that is perpendicular to a ground surface 92 as opposed to a horizontal discorectangular shape which comprises a discorectangular shape generally oriented in a plane that is parallel to a ground surface 92. In further embodiments, the device 100 may comprise tracks 11, 21, which may form a circular movement path 91, a rectangular movement path 91, a triangular movement path 91, or any other shape of continuous movement path 91 which allows the trolleys 41, 41A, 41B, 41C, to travel in a circuit.

Tracks 11, 21, may be constructed in any size and shape so as to support one or more rails 31A-31P and/or racks 35A-35N of any size and shape. In preferred embodiments, tracks 11, 21, may generally enclose their one or more rails 31A-31P and/or racks 35A-35N, in a first cavity 18 and second cavity 28, respectively, such as to protect them and the truck assemblies 51, 51A, 51B, from the weather/elements. For example, a first track 11 may comprise a first housing 16 having a first channel 17 granting access to the first cavity 18, and a second track 21 may comprise a second housing 26 having a second channel 27 granting access to the second cavity 28. The first housing 16 may join a first lower length 12, first upper length 13, first connector length 14, and second connector length 15 together, and the second housing 26 may join a second lower length 22, second upper length 23, third connector length 24, and fourth connector length 25 together with the truck axles 56 of the trolleys 41, 41A, 41B, 41C, extending through the channels 17, 27.

In preferred embodiments and referring to FIGS. 1A-3, the device 100 may comprise a first track 11 having a first lower length 12, a first upper length 13, a first connector length 14, and a second connector length 15 with the first connector length 14 and second connector length 15 each coupled to opposing ends of the first lower length 12 and the first upper length 13. Likewise, and in preferred embodiments, the device 100 may comprise a second track 21 having a second lower length 22, a second upper length 23, a third connector length 24 with the second lower length 22 with the third connector length 24 and fourth connector length 25 each coupled to opposing ends of the second lower length 22 and the second upper length 23.

Figure 2:
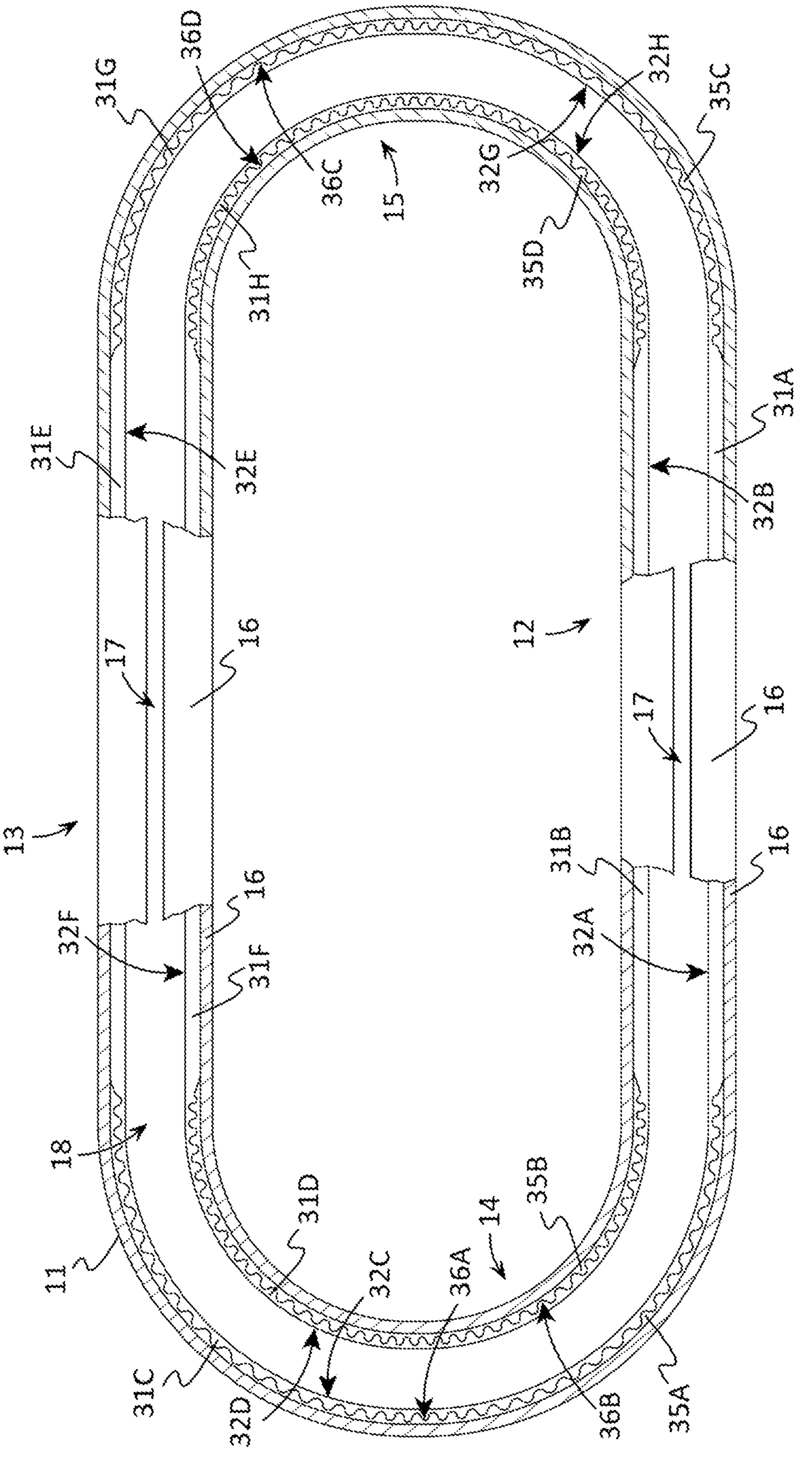
FIG. 2-FIG. 2 illustrates a partial sectional elevation view of an example of a first track, through line 2-2 shown in FIG. 1B, according to various embodiments described herein.

In some embodiments, the first track 11 may comprise a discorectangular shape, such as by having a generally linear shaped first lower length 12 and a generally linear shaped first upper length 13 with a generally C-shaped or U-shaped first connector length 14 and a generally C-shaped or U-shaped second connector length 15. Preferably, the first track 11 may comprise a vertical discorectangular shape so that the first upper length 13 may be positioned above the first lower length 12 as shown in FIGS. 1A, 1, and 2. In some embodiments, the second track 21 may comprise a discorectangular shape, such as by having a generally linear shaped second lower length 22 and a generally linear shaped second upper length 23 with a generally C-shaped or U-shaped third connector length 24 and a generally C-shaped or U-shaped fourth connector length 25. Preferably, the second track 21 may comprise a vertical discorectangular shape so that the second upper length 23 may be positioned above the second lower length 22 as shown in FIGS. 1A, 1B, and 3.

In preferred embodiments, the device 100 may comprise a first track 11 having a discorectangular shape and a second track 21 having a discorectangular shape, and the first track 11 may be substantially parallel (plus or minus 5 degrees and more preferably plus or minus less than 1 degree) to the second track 21.

As perhaps best shown in FIG. 1A, the device 100 may include one or more trolleys, such as a first trolley 41, a second trolley 41A, a third trolley 41B, a fourth trolley 41C, a fifth trolley, a sixth trolley, a seventh trolley, an eighth trolley, etc. A prime benefit of the device 100 of existing crane devices is the ability of the device 100 to transport multiple trolleys 41, 41A, 41B, 41C, all at the same time and the number of trolleys 41, 41A, 41B, 41C, is only constrained by the size of the loop structure formed by the tracks 11, 21. Trolleys 41, 41A, 41B, 41C, regardless of the number, will all generally move in one direction along the movement path 91 and will preferably only carry containers 93 on the lower section lengths 12, 22, with the upper section lengths 13, 23, used only for the return movement of the trolleys 41, 41A, 41B, 41C. With the device 100, one direction only trolley 41, 41A, 41B, 41C, movement is possible such that when a trolley 41, 41A, 41B, 41C, or trolleys 41, 41A, 41B, 41C, are returning on the upper section lengths 13, 23, an unproductive time, a lower trolley 41, 41A, 41B, 41C, or trolleys 41, 41A, 41B, 41C, are repositioning. It works one way for unloading and the opposite for loading. With the one trolley method of existing crane devices, only one function can be accomplished at any given time. With the device 100 of the present invention, a plurality of trolleys 41, 41A, 41B, 41C, can be performing many tasks all at the same time, positioning, attaching, lifting, transporting, positioning, dropping, and repositioning unproductive return, all done without interfering with the movement of any other trolleys 41, 41A, 41B, 41C.

Figure 3:
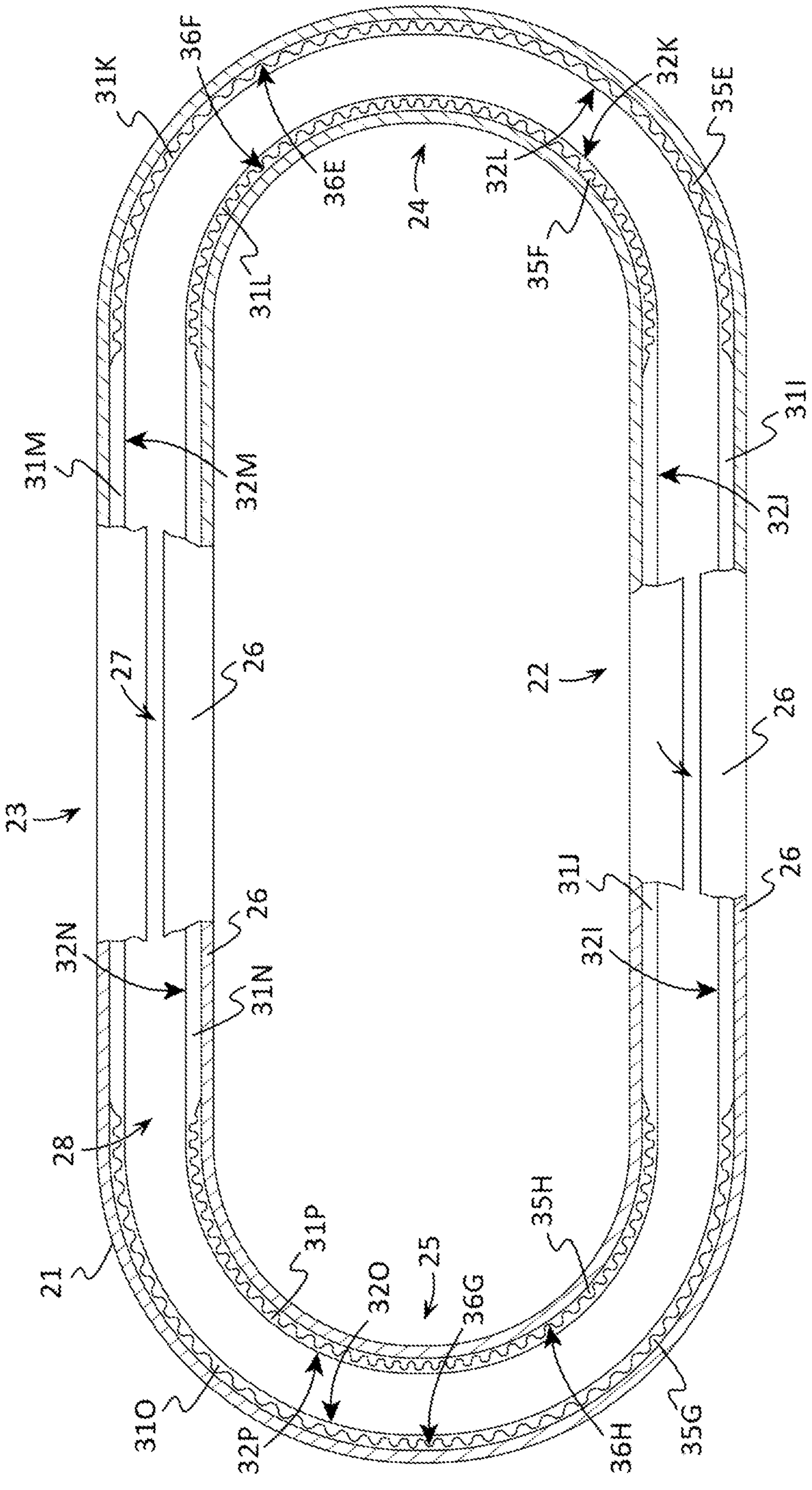
FIG. 3-FIG. 3 shows a partial sectional elevation view of an example of a second track, through line 3-3 shown in FIG. 1B, according to various embodiments described herein.

In some embodiments, and as perhaps best shown in FIGS. 2, and 3, each track 11, 21, may comprise one or more rails 31A-31P to which the truck assemblies 51 of the trolleys 41, 41A, 41B, 41C, may be engaged. Generally, a rail 31A-31P may comprise a length of material, such as steel or other suitable substantially rigid material, that provides a contact surface 32A-32P along its length, similar to a railroad rail.

In some embodiments and as shown in FIG. 2, a first track 11 may comprise a single rail 31A-31P which may be continuous in shape, preferably as a discorectangular shape, so as to extend completely through the first track 11 so that the rail 31A-31P comprises two flat or planar contact surfaces 32A-32P that are each coupled to two curved contact surfaces 32A-32P to form the discorectangular shape. In further embodiments, a first track 11 may comprise two or more rails 31A-31P. For example, a first lower length 12 may comprise a first rail 31A that may extend along the entire or a portion of the first lower length 12, a first upper length 13 may comprise a second rail 31B that may extend along the entire or a portion of the first upper length 13, a first connector length 14 may comprise a third rail 31C that may extend along the entire or a portion of the first connector length 14, and/or a second connector length 15 may comprise fourth rail 31D that may extend along the entire or a portion of the second connector length 15. In preferred embodiments, a first track 11 may comprise at least one rail 31A-31P in each lower 12 and upper 13 length with one or more rails 31A-31P in connector lengths 14, 15, being optional. In some embodiments, one or more rails 31A-31P of a first track 11 may be coupled together, such as to be continuous, or may be separated from each other, such as to have separate beginning and ending points.

A first track 11 may comprise one or more rails 31A-31P each having a contact surface 32A-32P of any size and shape. In some embodiments, the device 100 may comprise a first lower length 12 having a linear shaped rail 31A-31P that comprises a generally flat or planar contact surface 32A-32P. In some embodiments, the device 100 may comprise a first upper length 13 having a linear shaped rail 31A-31P that comprises a generally flat or planar contact surface 32A-32P. In some embodiments, the device 100 may comprise a first connector length 14 having a curved shaped rail 31A-31P that comprises a curved contact surface 32A-32P. In some embodiments, the device 100 may comprise a second connector length 15 having a curved shaped rail 31A-31P that comprises a curved contact surface 32A-32P.

In some embodiments and as shown in FIG. 3, a second track 21 may comprise a single rail 31A-31P which may be continuous in shape, preferably as a discorectangular shape, so as to extend completely through the second track 21 so that the rail 31A-31P comprises two flat or planar contact surfaces 32A-32P that are each coupled to two curved contact surfaces 32A-32P to form the discorectangular shape. In further embodiments, a second track 21 may comprise two or more rails 31A-31P. For example, a second lower length 22 may comprise a first rail 31I that may extend along the entire or a portion of the first lower length 22, a second upper length 23 may comprise a second rail 31N that may extend along the entire or a portion of the second upper length 23, a third connector length 24 may comprise a third rail 31K that may extend along the entire or a portion of the third connector length 24, and/or a fourth connector length 25 may comprise fourth rail 31O that may extend along the entire or a portion of the fourth connector length 25. In preferred embodiments, a second track 21 may comprise at least one rail 31A-31P in each lower 22 and upper 23 length with one or more rails 31A-31P in connector lengths 24, 25, being optional. In some embodiments, one or more one or more rails 31A-31P of a second track 21 may be coupled together, such as to be continuous, or may be separated from each other, such as to have separate beginning and ending points.

A second track 21 may comprise one or more rails 31A-31P each having a contact surface 32A-32P of any size and shape. In some embodiments, the device 100 may comprise a second lower length 22 having a linear shaped rail 31A-31P that comprises a generally flat or planar contact surface 32A-32P. In some embodiments, the device 100 may comprise a second upper length 23 having a linear shaped rail 31A-31P that comprises a generally flat or planar contact surface 32A-32P. In some embodiments, the device 100 may comprise a third connector length 24 having a curved shaped rail 31A-31P that comprises a curved contact surface 32A-32P. In some embodiments, the device 100 may comprise a fourth connector length 25 having a curved shaped rail 31A-31P that comprises a curved contact surface 32A-32P.

In some embodiments, and as perhaps best shown in FIGS. 2, and 3, each track 11, 21, may comprise one or more racks 35A-35N to which the truck assemblies 51 of the trolleys 41, 41A, 41B, 41C, may be engaged. Generally, a rack 35A-35N may comprise a length of material, such as steel or other suitable substantially rigid material, that provides a geared surface 36A-36H along its length as needed, similar to a rack in a rack railway. A geared surface 36A-36H may comprise a plurality of gear teeth of any configuration, such as straight gear teeth, helical (angled/slanted) gear teeth, double slanted herringbone gear teeth, or any other design including combinations of designs which produce the necessary strength and power as well as wear longevity.

In some embodiments, a first track 11 may comprise a single rack 35A-35N which may be continuous in shape, preferably as a discorectangular shape, so as to extend completely through the first track 11 so that the rack 35A-35N comprises two flat or planar geared surfaces 36A-36H that are each coupled to two curved geared surfaces 36A-36H to form the discorectangular shape. In further embodiments and as shown in FIG. 2, a first track 11 may comprise two or more racks 35A-35N. For example, a first connector length 14 may comprise a rack 35A that may extend along the entire or a portion of the first connector length 14 and/or a second connector length 15 may comprise a rack 35C that may extend along the entire or a portion of the second connector length 15. In preferred embodiments, a first track 11 may comprise at least one rack 35A-35N in each connector length 14, 15, with one or more racks 35A-35N in lower 12 or upper 13 lengths being optional. In some embodiments, one or more, one or more racks 35A-35N of a first track 11 may be coupled together, such as to be continuous, or may be separated from each other, such as to have separate beginning and ending points.

A first track 11 may comprise one or more racks 35A-35N each having a geared surface 36A-36H of any size and shape. In some embodiments, the device 100 may comprise a first lower length 12 having a linear shaped rack 35A-35N that comprises a generally flat or planar geared surface 36A-36H. In some embodiments, the device 100 may comprise a first upper length 13 having a linear shaped rack 35A-35N that comprises a generally flat or planar geared surface 36A-36H. In some embodiments and as shown in FIG. 2, the device 100 may comprise a first connector length 14 having one or more curved shaped racks 35A, 35B, that comprise a curved geared surface 36A, 36B. In some embodiments and as shown in FIG. 2, the device 100 may comprise a second connector length 15 having one or more curved shaped racks 35C, 35D, that comprise a curved geared surface 36C, 36D.

In some embodiments, a second track 21 may comprise a rack 35A-35N which may be continuous in shape, preferably as a discorectangular shape, so as to extend completely through the second track 21 so that the rack 35A-35N comprises two flat or planar geared surfaces 36A-36H that are each coupled to two curved geared surfaces 36A-36H to form the discorectangular shape. In further embodiments and as shown in FIG. 3, a second track 21 may comprise two or more racks 35A-35N. For example, a third connector length 24 may comprise a rack 35E that may extend along the entire or a portion of the third connector length 24 and/or a fourth connector length 25 may comprise a rack 35G that may extend along the entire or a portion of the fourth connector length 25. In preferred embodiments, a second track 21 may comprise at least one rack 35A-35N in each connector length 24, 25, with one or more racks 35A-35N in lower 22 or upper 23 lengths being optional. In some embodiments, one or more racks 35A-35N of a second track 21 may be coupled together, such as to be continuous, or may be separated from each other, such as to have separate beginning and ending points.

A second track 21 may comprise one or more racks 35A-35N each having a geared surface 36A-36H of any size and shape. In some embodiments, the device 100 may comprise a second lower length 22 having a linear shaped rack 35A-35N that comprises a generally flat or planar geared surface 36A-36H. In some embodiments, the device 100 may comprise a second upper length 23 having a linear shaped rack 35A-35N that comprises a generally flat or planar geared surface 36A-36H. In some embodiments and as shown in FIG. 3, the device 100 may comprise a third connector length 24 having one or more curved shaped racks 35E, 35F, that comprise a curved geared surface 36E, 36F. In some embodiments, the device 100 may comprise a fourth connector length 25 having one or more curved shaped racks 35G, 35H, that comprise a curved geared surface 36G, 36H.

In some embodiments, a rail 31A-31P may be coupled to a rack 35A-35N such as by being integrally formed, molded, or machined together, by being welded together, by being fastened together, such as with rivets or other fasteners, or with any other suitable coupling method. In further embodiments, the device 100 may comprise a rail 31A-31P that is coupled to two racks 35A-35N such as by having the rail 31A-31P coupled between the two racks 35A-35N. In further embodiments, the device 100 may comprise a rack 35A-35N that is coupled to two rails 31A-31P such as by having the rack 35A-35N coupled between the two rails 31A-31P. In further embodiments, a rail 31A-31P and a rack 35A-35N may be distinct or separated from each other while being coupled to the same track 11, 21, or same length 12, 13, 14, 15, 22, 23, 24, 25.

The device 100 may comprise one or more trolleys 41, 41A, 41B, 41C, that are movably coupled to a first track 11 and to a second track 21 so that the trolleys 41, 41A, 41B, 41C, are configured to move in a movement path 91 defined by the first 11 and second 21 tracks. In preferred embodiments, each trolley 41, 41A, 41B, 41C, may comprise a lifting mechanism 42A, 42B, which may couple the trolley 41, 41A, 41B, 41C, to a container spreader 43A, 43B. In preferred embodiments, the device 100 may be configured to support two or more trolleys 41, 41A, 41B, 41C, all at the same time with the number of supported trolleys 41, 41A, 41B, 41C, only constrained by the size of the tracks 11, 21. Trolleys 41, 41A, 41B, 41C, regardless of the number, may generally all move or cycle in one direction and may only carry containers 93 on the lower lengths 12, 22, with the upper lengths 13, 23, preferably used only for the return movement of the trolleys 41, 41A, 41B, 41C.

In some embodiments, a trolley 41, 41A, 41B, 41C, may include a control cab 44, which controls the trolley 41, 41A, 41B, 41C, movement through manual, and automatic control sent and received between the operating onboard equipment and may be done so through either direct connection, or wireless or both. The control cab 44 manages the tasks of dropping the container spreader 43A, 43B, lifting the container spreader 43A, 43B, transporting a container 93, repositioning the container spreader 43A, 43B, etc. In some embodiments, the control cab 44 may direct the trolley 41, 41A, 41B, 41C, to automatically without operator control, when the truck assembly 51, 51A, 51B, of the trolley 41, 41A, 41B, 41C, moves along a connector length 14, 15, 24, 25, to engage one or more pinions 54A-54H of the truck assembly(s) 51, 51A, 51B, to a rack 35A-35N. Preferably, control of movement of a trolley 41, 41A, 41B, 41C, may be from a trolley mounted control cabin 44 and/or remotely from an individual ground/ship based control device or devices: Remote control.

Optionally, each trolley 41, 41A, 41B, 41C, may be equipped with bumpers 45, similar to those on European railroad cars, to ensure that if two trolleys 41, 41A, 41B, 41C, inadvertently contact each other, no damage is done. Preferably, to warn operators of pending contact, trolleys 41, 41A, 41B, 41C, may be equipped with close contact devices, such as proximity radar, Collision Warning Radar, etc., commonly known as car backup detectors to ensure early notification of potential contact, and if necessary to automatically stop trolley 41, 41A, 41B, 41C, movement.

A trolley 41, 41A, 41B, 41C, may connect electronically to its one or more truck assemblies 51, 51A, 51B by hard wire or radio control. In some embodiments, a trolley 41, 41A, 41B, 41C, may be configured to operate under computer control at a point that a trolley 41, 41A, 41B, 41C, moves along a particular portion of a track 11, 21, such as a connector length 14, 15, 24, 25. The computer may guide the trolley 41, 41A, 41B, 41C, and may automatically rotate the lifting mechanism 42A, 42B, as necessary to ensure the spreader 43A, 43B, is properly positioned when traversing an upper length 13, 23.

A container spreader 43A, 43B, may comprise a device used for lifting shipping containers 93 and other unitized cargo. The container spreader 43A, 43B, is placed between a shipping container 93 and the lifting mechanism 42A, 42B. Generally, a container spreader 43A, 43B, used for shipping containers 93 has a locking mechanism at each corner that attaches to the four corners of the container 93. A container spreader 43A, 43B, can be used on a container crane, a straddle carrier and with any other machinery to lift containers 93. Spreader 43A, 43B, operation can be manual, semi automatic, or fully automatic.

A lifting mechanism 42A, 42B, may comprise an arrangement of cable, pulleys, and one or more motors which may be used to raise and lower a container spreader 43A, 43B, that is coupled to the lifting mechanism 42A, 42B, and any shipping container 93 that is being manipulated by the container spreader 43A, 43B.

Figure 5A:
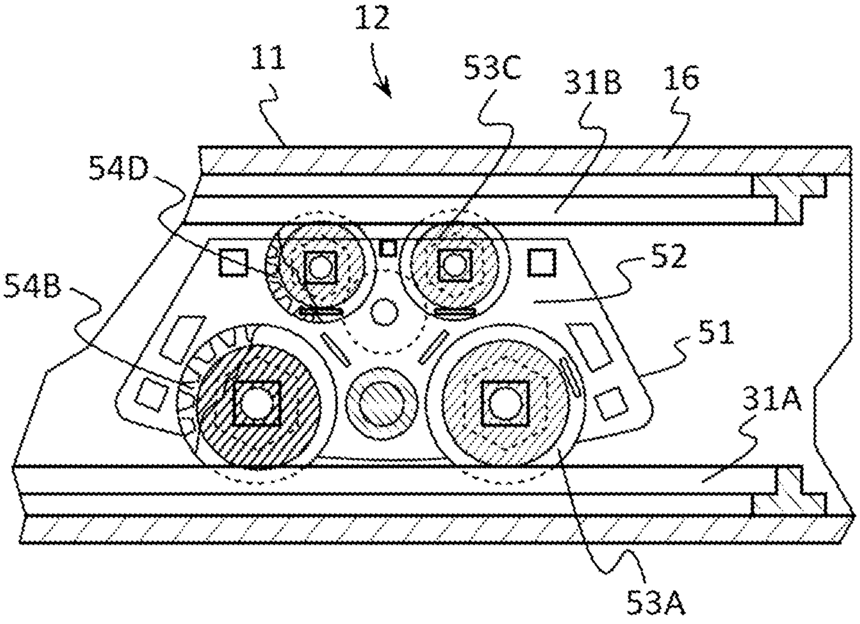
FIG. 5A-FIG. 5A illustrates a partial sectional, elevation view of an example of a truck assembly in a lower length of a track (first lower length of first track as viewed through line 5A-5A shown in FIG. 1B) according to various embodiments described herein.
Figure 5B:
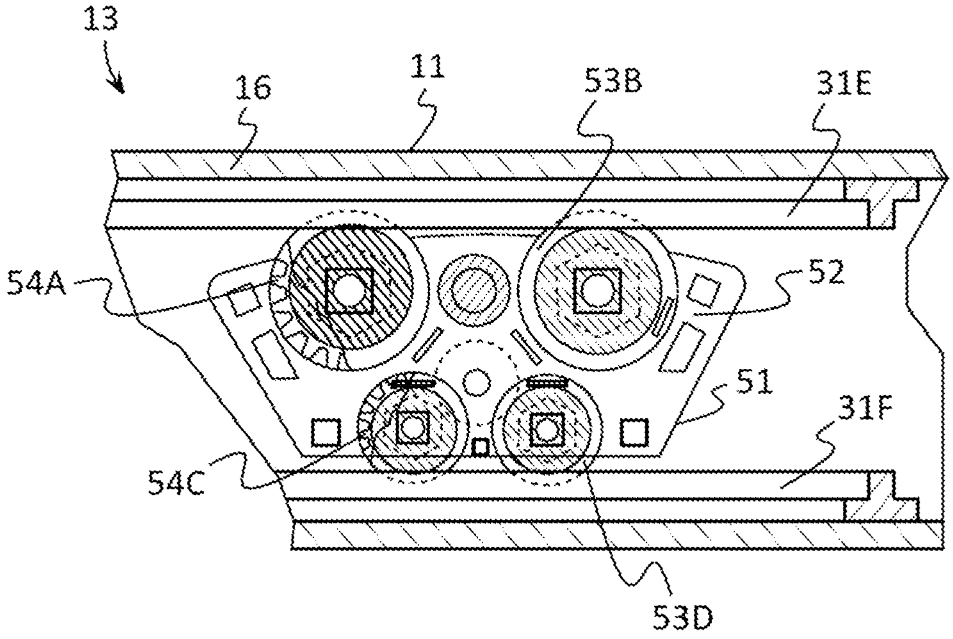
FIG. 5B-FIG. 5B depicts a partial sectional, elevation view of an example of a truck assembly in an upper length of a track (first upper length of first track as viewed through line 5B-5B shown in FIG. 1B) according to various embodiments described herein.
Figure 6:
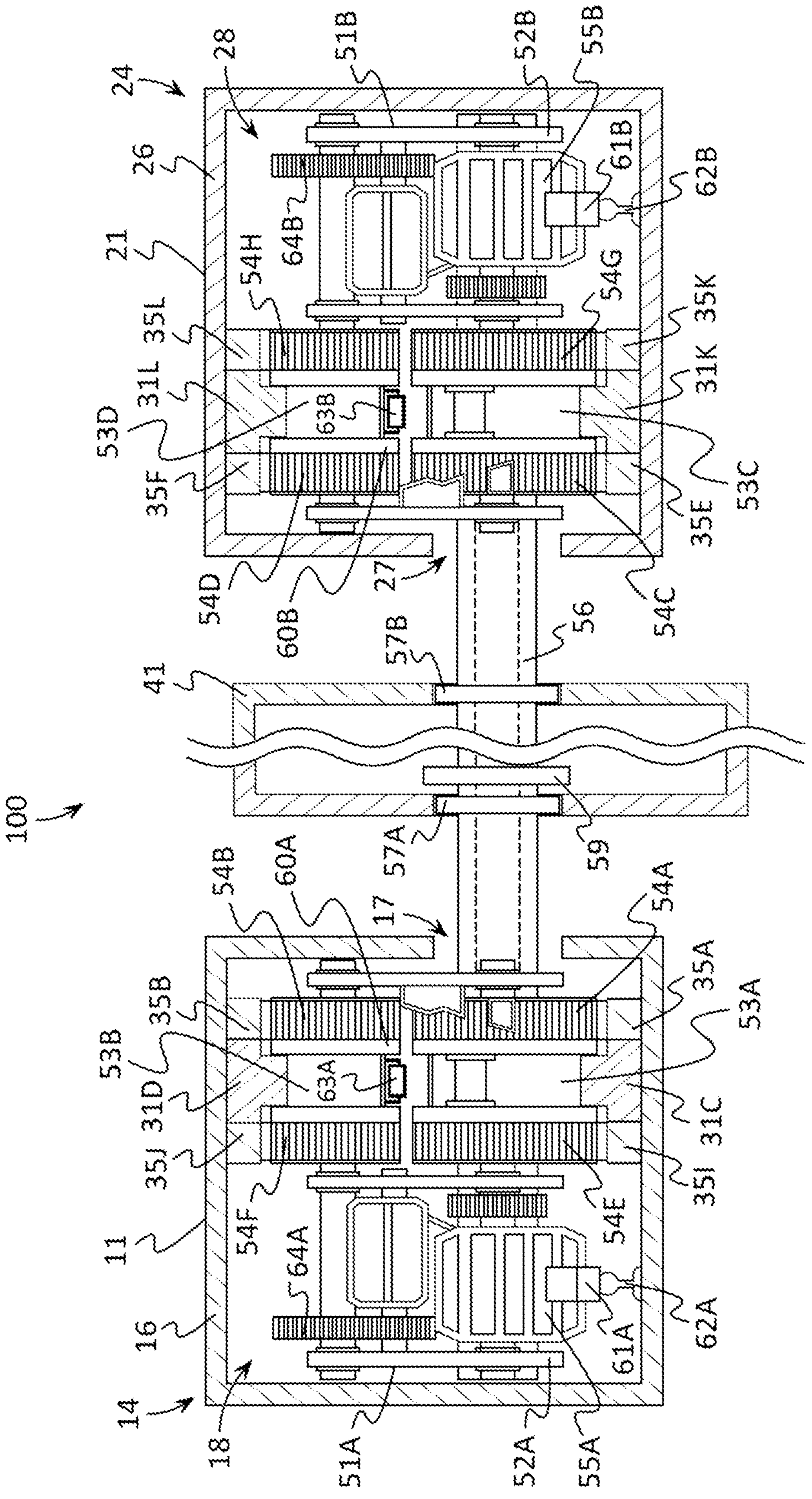
FIG. 6-FIG. 6 shows a sectional, elevation view, of first connector length of first track through line 6-6 shown in FIG. 1B, of an example of a continuous container crane device according to various embodiments described herein.

As perhaps best shown in FIGS. 4-9, in some embodiments, each trolley 41, 41A, 41B, 41C, may be coupled to a track 11, 21, via one or more truck assemblies 51, 51A, 51B. In preferred embodiments and as shown by the example of FIG. 6, each trolley 41, 41A, 41B, 41C, may be coupled to a first track 11 via a first truck assembly 51A and coupled to a second track 21 via a second truck assembly 51B. Each truck assembly 51, 51A, 51B, may comprise a side frame 52A, 52B, to which one or more wheels 53A-53D, pinions 54A-54H, and motors 55A, 55B, may be coupled to.

A truck axle 56 and/or any other suitable coupling method may couple a truck assembly 51, 51A, 51B, to a trolley 41, 41A, 41B, 41C. Preferably, the truck axle 56 may not revolve, and may be coupled to the trolley 41, 41A, 41B, 41C, using truck axle roller bearings 57A, 57B, which allow the trolley 41, 41A, 41B, 41C, to rotate relative to the truck axle 56 as the truck assembly 51, 51A, 51B, moves up or down a connector length 14, 15, 24, 25, and rotates 180 degrees so that the trolley 41, 41A, 41B, 41C, may be pivotally coupled to the truck assembly 51, 51A, 51B. In preferred embodiments and as perhaps best shown in FIGS. 2, 3, and 6, each track 11, 21, may comprise a channel 17, 27, which the truck axles 56 may extend through so that the channels 17, 27, may resemble the movement path 91. It should be understood that in some embodiments a channel 17, 27, may be generally centrally located in a housing 16, 26, and in further embodiments a channel 17, 27, may be generally located off center in a housing 16, 26, without departing from the scope of the invention. Preferably, to dampen any possible sway when traversing the straight lengths 12, 13, 23, 24, or when ascending or descending the curved lengths 14, 15, 24, 25, a Gyro may be used which may control the truck axle 56 via directing a locking mechanism 59 (FIG. 6) on it to control rotation or pivoting relative to truck assemblies 51, 51A, 51B, to insure level trolley 41, 41A, 41B, 41C, orientation.

The device 100 may comprise one or more motors 55A, 55B, (FIG. 6) which may be used to motivate the truck assemblies 51, 51A, 51B, of each trolley along the tracks 11, 21. In preferred embodiments, one or more motors 55A, 55B, may be coupled to the truck assemblies 51, 51A, 51B. In further embodiments, one or more motors 55A, 55B, may be coupled to a trolley 41, 41A, 41B, 41C, and be operatively coupled to its truck assemblies 51, 51A, 51B. Generally, a motor 55A, 55B, may be configured to rotate one or more wheels 53A-53D and/or pinions 54A-54H via a direct drive engagement, gearing 64A, 64B, or any other suitable method.

A motor 55A, 55B, may comprise a brushed DC motor, brushless DC motor, switched reluctance motor, universal motor, AC polyphase squirrel-cage or wound-rotor induction motor, AC SCIM split-phase capacitor-start motor, AC SCIM split-phase capacitor-run motor, AC SCIM split-phase auxiliary start winding motor, AC induction shaded-pole motor, wound-rotor synchronous motor, hysteresis motor, synchronous reluctance motor, pancake or axial rotor motor, stepper motor, or any other type of motor. An electric motor 55A, 55B, may receive power supplied through a power transfer paddle 61A, 61B, and an insulated power third rail 62A, 62B. In further embodiments, a motor 55A, 55B, may comprise a hydraulic motor such as a Gear and vane motor, Gerotor motor, Axial plunger motors, Radial piston motors, or any other hydraulically motivated motor. In still further embodiments, a motor 55A, 55B, may comprise a pneumatic motor, such as a linear pneumatic motor and a pneumatic rotary vane motor.

In preferred embodiments, a truck assembly 51, 51A, 51B, may comprise a side frame 52A, 52B, with one or more wheels 53A-53D and/or one or more pinions 54A-54H. Generally, a wheel 53A-53D may comprise a circular object that revolves on an axle so that the wheel 53A-53D may move easily across a contact surface 32A-32P of a rail 31A-31P. Generally, a pinion 54A-54H may comprise a round gear having a plurality of teeth that are able to engage the geared surface 36A-36H of a rack 35A-35N. The engagement of the pinion 54A-54H teeth and a geared surface 36A-36H prevent the pinion 54A-54H from moving relative to the geared surface 36A-36H unless the pinion 54A-54H is rotated so as to enable a controlled ascent or descent of a truck assembly 51, 51A, 51B, through a connector length 14, 15, 24, 25, having a rack 35A-35N.

Optionally, a wheel 53A-53D and a pinion 54A-54H may be separate structures or they may be coupled together or integrally formed together. Preferably, a wheel 53A-53D may be coupled to and between two pinions 54A-54H. In some embodiments, a wheel 53A-53D may comprise one or more flanges 60A, 60B, such as used on railroad wheels, which may contact portions of a rail 31A-31P that are below its contact surface 32A-32P to maintain the positioning of the wheel 53A-53D to be in contact with the rail 31A-31P. In further embodiments, a pinion 54A-54H may be configured with a diameter that is larger than the diameter of a wheel 53A-53D that it may be coupled to so that the pinion 54A-54H may function as a flange 60A, 60B. Optionally, a truck assembly 51, 51A, 51B, may comprise friction brake pads 63A, 63B, or any other suitable movement arresting device or method.

Figure 4:
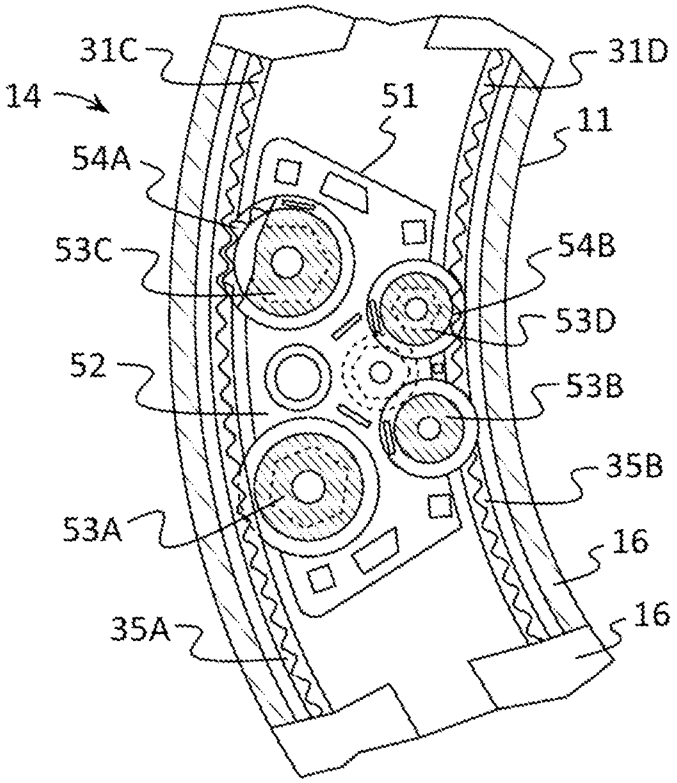
FIG. 4-FIG. 4 depicts a partial sectional, elevation view of an example of a truck assembly in a connector length of a track (first connector length of first track as viewed through line 4-4 shown in FIG. 1B) according to various embodiments described herein.

FIG. 4 illustrates an example of a truck assembly 51 traveling along a curved connector length 14, 15, 24, 25, which may enable vertical motion between lower lengths 12, 22, and upper lengths 13, 23. In this example, a truck assembly 51 is shown in a first connector length 14 according to section line 4-4 of FIG. 1B. In some embodiments, the device 100 comprises two racks 35A, 35B, that one or more pinions 54A-54H of a truck assembly 51, 51A, 51B, may engage with to control ascending or descending movement through a curved connector length 14, 15, 24, 25. In preferred embodiments, a connector length 14, 15, 24, 25, comprises a first rack 35A and a second rack 35B, and a truck assembly 51, 51A, 51B, may comprise at least two pinions 54A-54H that are positioned between the first rack 35A and the second rack 35B. In further embodiments, a connector length 14, 15, 24, 25, may comprise a single rack 35A-35N. Optionally, a connector length 14, 15, 24, 25, may comprise one or more rails 31A-31P, such as rails 31C, 31D, shown in this example.

FIG. 5A depicts an example of a truck assembly 51 traveling along a lower length 12, 22, such as first lower length 12 in this example and according to section line 5A-5A of FIG. 1B, which may enable horizontal motion between curved connector lengths 14, 15, 24, 25. In this example, the device 100 comprises two rails 31A, 31B, that one or more wheels 53A-53D of a truck assembly 51, 51A, 51B, may engage with to control horizontal movement through the first lower length 12. In preferred embodiments, a lower length 12, 22, or an upper length 13, 23, (first lower length 12 in this example) may comprise a first rail 31A and a second rail 31B, and a truck assembly 51, 51A, 51B, may comprise at least two wheels 53A-53D that are positioned between the first rail 31A and the second rail 31B. Also referring to FIG. 5B which depicts an example of a truck assembly 51 traveling along an upper length 13, 23, such as first upper length 13 in this example and according to section line 5B-5B of FIG. 1B, which may also enable horizontal motion between curved connector lengths 14, 15, 24, 25. In preferred embodiments, a truck assembly 51, 51A, 51B, may comprise a first wheel 53A that engages with a first rail 31A in a lower length 12, 22, of a track 11, 21, to motivate the truck assembly 51, 51A, 51B, along the lower length 12, 22, and the truck assembly 51, 51A, 51B, may comprise a second wheel 53D that engages with a second rail 31F in an upper length 13, 23, of the track 11, 21, to motivate the truck assembly 51, 51A, 51B, along the upper length 13, 23. In further embodiments, a lower length 12, 22, or an upper length 13, 23, may comprise a single rail or three or more rails 31A-31P. Optionally, a lower length 12, 22, or an upper length 13, 23, may comprise one or more racks 35A-35N.

FIG. 6 shows an example of a trolley 41 movably coupled to a first track 11 and a second track 21 via a first truck assembly 51A and a second truck assembly 51B along section line 6-6 in FIG. 1B. In this example, the first track 11 comprises two rails 31C, 31D, and four racks 35A, 35B, 35I, 35J, which the first truck assembly 51A is movably coupled to, and the second track 21 comprises two rails 31K, 31L, and four racks 35E, 35F, 35K, 35L, which the second truck assembly 51B is movably coupled to. In this and some embodiments, a first truck assembly 51A engaged to a first track 11 may comprise a wheel 53A that engages with one rail 31C and another wheel 53B that engages with another rail 31D, and the wheels 53A, 53B, may be positioned between the rails 31C, 31D. Likewise, a second truck assembly 51B engaged to a second track 21 may comprise a wheel 53C that engages with a one rail 31K and another wheel 53D that engages with another rail 31L, and the wheels 53C, 53D, may be positioned between the rails 31K, 31L. Also, in this and some embodiments, a first truck assembly 51A engaged to a first track 11 may comprise a pinion 54A that engages with a first rack 35A and another pinion 54B that engages with a second rack 35B, and the pinions 54A, 54B, may be positioned between the racks 35A, 35B. Optionally, one or more lengths 12, 13, 14, 15, of a first track 11 may comprise further racks 35I, 35J, which may engage with further pinions 54E, 5F, on first truck assembly 51A. Likewise, a second truck assembly 51B engaged to a second track 21 may comprise a pinion 54C that engages with a rack 35C and another pinion 54D that engages with another rack 35C, and the pinions 54C, 54D, may be positioned between the racks 35C, 35D. Optionally, one or more lengths 22, 23, 24, 25, of a second track 21 may comprise further racks 35K, 35L, which may engage with further pinions 54G, 54H, on second truck assembly 51B.

Figure 7:
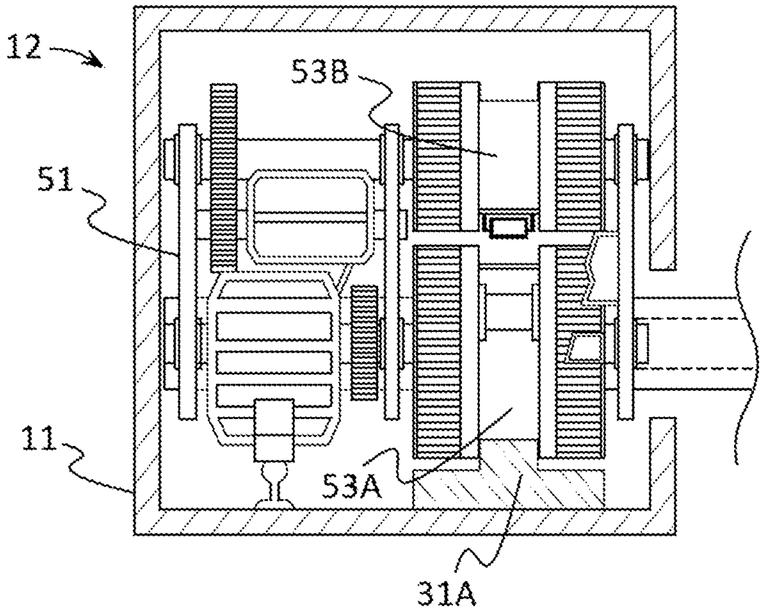
FIG. 7-FIG. 7 depicts a partial sectional, elevation view of an example of a truck assembly in a lower length of a track (first lower length of first track as viewed through line 7 shown in FIG. 1B) according to various embodiments described herein.
Figure 8:
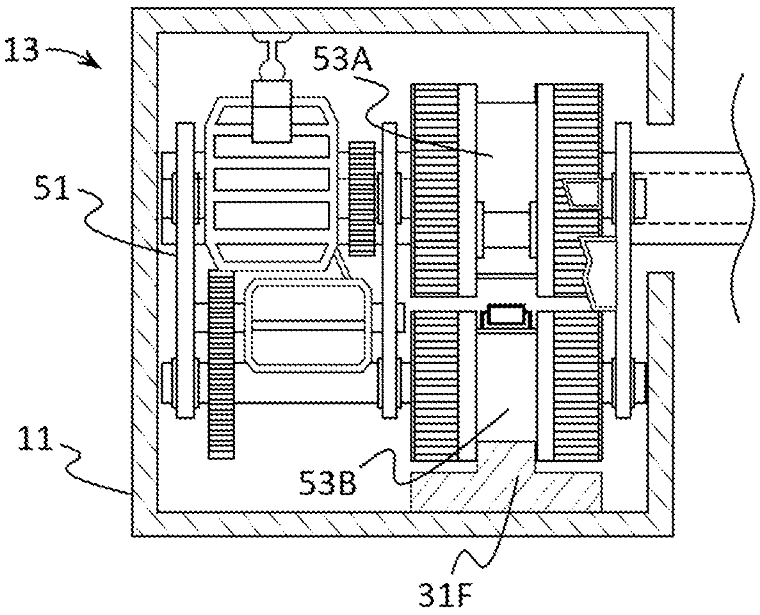
FIG. 8-FIG. 8 illustrates a partial sectional, elevation view of an example of a truck assembly in an upper length of a track (first upper length of first track as viewed through line 8-8 shown in FIG. 1B) according to various embodiments described herein.

FIG. 7 illustrates an example of a first track 11 having a single rail 31A in a portion of a lower length 12 which a first wheel 53A of a truck assembly 51 may contact and engage with according to section line 7-7 in FIG. 1B, and FIG. 8 illustrates an example of a first track 11 having a single rail 31F in a portion of an upper length 13, 23, which a second wheel 53B of a truck assembly 51 may contact and engage with according to section line 7-7 in FIG. 1B. Preferably, each lower length 12, 22, and/or each upper length 13, 23, may have at least one rail 31A-31P which a truck assembly 51, 51A, 51B, may be movably coupled or engaged to.

Figure 9:
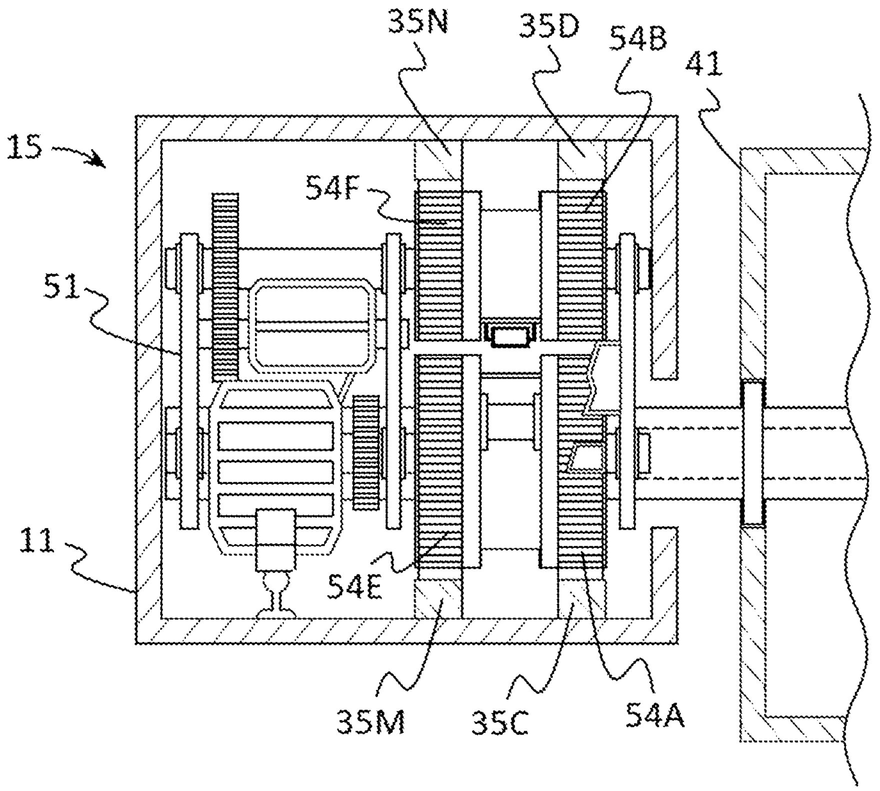
FIG. 9-FIG. 9 shows a partial sectional, elevation view of an example of a truck assembly in a connector length of a track (second connector length of first track as viewed through line 9-9 shown in FIG. 1B) according to various embodiments described herein.

FIG. 9 depicts an example of a first track 11 according to section line 9-9 in FIG. 1B, having four racks 35C, 35D, 35M, 35N, in a second connector length 15 which one or more pinions 54A, 54B, 54E, 54F of a truck assembly 51 may contact and engage with to enable controlled ascent and/or descent through the second connector length 15. Preferably, each connector length 14, 15, 24, 25, may have at least one rack 35A-35N which a truck assembly 51, 51A, 51B, may be movably coupled or engaged to.

It should be understood that the device 100 may comprise a greater number of rails 31A-31P, racks 35A-35N wheels 53A-53D, and/or pinions 54A-54H to accommodate higher weight and higher usage lifting applications.

While some exemplary shapes and sizes have been provided for elements of the device 100, it should be understood to one of ordinary skill in the art that the tracks 11, 12, trolleys 41, truck assemblies 51, 51A, 51B, rails 31A-31P, racks 35A-35N and any other element described herein may be configured in a plurality of sizes and shapes including "T" shaped, "X" shaped, square shaped, rectangular shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention.

Additionally, while some materials have been provided, in other embodiments, the elements that comprise the device 100 may be made from or may comprise durable materials such as aluminum, steel, other metals and metal alloys, wood, hard rubbers, hard plastics, fiber reinforced plastics, carbon fiber, fiberglass, resins, polymers or any other suitable materials including combinations of materials. In some embodiments, one or more of the elements that comprise the device 100 may be coupled or connected together with heat bonding or welding, chemical bonding, adhesives, rivet type fasteners, threaded type fasteners, other types of fasteners, or any other suitable joining method. In further embodiments, one or more of the elements that comprise the device 100 may be coupled by being one of connected to and integrally formed with another element of the device 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A continuous container crane device, the device comprising:

a first track having a continuous discorectangular shape;

a second track having a continuous discorectangular shape, wherein the first track is substantially parallel and adjacent to the second track; and a first trolley that is movably coupled to both the first track and to the second track so that the first trolley is configured to move in a continuous movement path while moveably coupled to both the first and second tracks, wherein the first trolley includes a first lifting mechanism.

2. The device of claim 1, wherein the first trolley is movably coupled to the first track via a truck assembly, wherein the truck assembly comprises a first wheel that engages with a first rail to motivate the truck assembly along the first track.

3. The device of claim 1, wherein the first trolley is movably coupled to the first track via a truck assembly, wherein the truck assembly comprises at least one pinion that engages with a first rack to motivate the truck assembly along a first connector length, and wherein the at least one pinion engages with a second rack to motivate the truck assembly along a second connector length.

4. The device of claim 3, wherein a first connector length comprises the first rack and a third rack, and wherein the truck assembly comprises at least two pinions that are positioned between the first rack and the third rack.

5. The device of claim 1, further comprising a second trolley that is movably coupled to both the first track and to the second track so that the second trolley is configured to move in the continuous movement path defined by the first and second track, wherein the second trolley includes a second lifting mechanism and a container spreader.

6. A continuous container crane device, the device comprising:

a first track having a discorectangular shape, wherein the first track comprises a first lower length, a first upper length, a first connector length, and a second connector length, wherein the first upper length is positioned above the first lower length, wherein the first connector length and second connector length are each coupled to opposing ends of the first lower length and the first upper length;

a second track having a discorectangular shape, wherein the first track is substantially parallel to the second track;

a first trolley that is movably coupled to the first track and to the second track so that the first trolley is configured to move in a vertical stadium shaped movement path defined by the first and second tracks, wherein the first trolley includes a first lifting mechanism and a first container spreader; and a second trolley that is movably coupled to the first track and to the second track so that the second trolley is configured to move in the vertical stadium shaped movement path defined by the first and second track, wherein the second trolley includes a second lifting mechanism and a second container spreader.

7. The device of claim 6, wherein the first lower length comprises a first rail and the first upper length comprises a second rail.

8. The device of claim 7, wherein the first trolley is movably coupled to the first track via a truck assembly, wherein the truck assembly comprises a first wheel that engages with the first rail to motivate the truck assembly along the first lower length, and wherein the truck assembly comprises a second wheel that engages with the second rail to motivate the truck assembly along the first upper length.

9. The device of claim 7, wherein the first connector length comprises a first rack and the second connector length comprises a second rack.

10. The device of claim 9, wherein the first trolley is movably coupled to the first track via a truck assembly, wherein the truck assembly comprises a pinion that engages with the first rack to motivate the truck assembly along the first connector length, and wherein the pinion engages with the second rack to motivate the truck assembly along the second connector length.

11. The device of claim 10, wherein the first connector length comprises a first rack and a third rack, and wherein the truck assembly comprises at least two pinions that are positioned between the first rack and the third rack.

12. The device of claim 10, wherein the truck assembly comprises a first wheel that engages with the first rail to motivate the truck assembly along the first lower length, and wherein the truck assembly comprises a second wheel that engages with the second rail to motivate the truck assembly along the first upper length.

13. The device of claim 12, wherein the first trolley is pivotally coupled to the truck assembly.

14. The device of claim 6, wherein the first track is oriented perpendicular to a ground surface, and wherein the second track is oriented perpendicular to a ground surface.

* * * * *